US012567673B2

(12) United States Patent
Ghassemiparvin et al.

(10) Patent No.: US 12,567,673 B2
(45) Date of Patent: Mar. 3, 2026

(54) ELECTRONIC DEVICE HAVING STACKED-PATCH ANTENNA WITH FLOATING GROUND VIA

(71) Applicant: Apple Inc., Cupertino, CA (US)

(72) Inventors: Behnam Ghassemiparvin, San Jose, CA (US); Jingni Zhong, Santa Clara, CA (US); Ming Chen, Cupertino, CA (US); Bhaskara R Rupakula, San Jose, CA (US); Yiren Wang, Cupertino, CA (US); Han Wang, Campbell, CA (US); Yuan Tao, Santa Clara, CA (US); Victor C Lee, Santa Clara, CA (US); Salih Yarga, San Jose, CA (US); Erdinc Irci, Sunnyvale, CA (US); Jennifer M Edwards, San Francisco, CA (US); Hao Xu, Cupertino, CA (US); Hongfei Hu, Cupertino, CA (US); Carlo Di Nallo, Belmont, CA (US); Mattia Pascolini, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 349 days.

(21) Appl. No.: 18/477,868

(22) Filed: Sep. 29, 2023

(65) Prior Publication Data

US 2025/0112371 A1 Apr. 3, 2025

(51) Int. Cl.
*H01Q 9/04* (2006.01)
*H01Q 19/00* (2006.01)

(52) U.S. Cl.
CPC .......... *H01Q 9/045* (2013.01); *H01Q 9/0414* (2013.01); *H01Q 19/005* (2013.01)

(58) Field of Classification Search
CPC ..... H01Q 9/045; H01Q 9/0414; H01Q 19/005
See application file for complete search history.

(56) References Cited

U.S. PATENT DOCUMENTS

| | | | | |
|---|---|---|---|---|
| 6,759,980 | B2 | 7/2004 | Chen et al. | |
| 9,692,125 | B1 | 6/2017 | Channabasappa et al. | |
| 10,741,920 | B2 | 8/2020 | Veihl et al. | |
| 11,121,469 | B2 * | 9/2021 | Paulotto .................. | H01Q 1/48 |
| 11,340,329 | B2 | 5/2022 | Paulotto et al. | |

(Continued)

FOREIGN PATENT DOCUMENTS

WO 2022255503 A1 12/2022

*Primary Examiner* — Henry Luong
(74) *Attorney, Agent, or Firm* — Treyz Law Group, P.C.; Michael H. Lyons

(57) ABSTRACT

An electronic device may be provided with an antenna module having a substrate. An antenna may be disposed on the substrate. The antenna may have a directly fed patch and parasitic patches. The antenna may be fed by a feed via. The parasitic patches may include a first layer of parasitic patches separated by a gap overlapping the directly fed patch. The parasitic patches may include an additional parasitic patch formed in a second layer. The additional parasitic patch may overlap the gap. A floating ground via may couple a center of the additional parasitic patch and a center of the directly fed patch to a landing pad in a ground layer. The landing pad may short the via to the ground layer at the radiating frequency of the antenna. The landing pad may be electrically floating at DC frequencies.

20 Claims, 8 Drawing Sheets

(56) References Cited

U.S. PATENT DOCUMENTS

| | | | |
|---|---|---|---|
| 11,502,391 | B2 | 11/2022 | Yong et al. |
| 2019/0123443 | A1 | 4/2019 | Russell et al. |
| 2021/0265745 | A1 | 8/2021 | Edwards et al. |
| 2022/0094061 | A1 | 3/2022 | Yong et al. |
| 2022/0285834 | A1 | 9/2022 | Wu et al. |
| 2023/0084310 | A1 | 3/2023 | Cooper et al. |
| 2023/0208009 | A1 | 6/2023 | Prabhu Gaunkar et al. |

* cited by examiner

ELECTRONIC DEVICE HAVING STACKED-PATCH ANTENNA WITH FLOATING GROUND VIA

FIELD

This relates generally to electronic devices, including electronic devices with wireless communications capabilities.

BACKGROUND

Electronic devices such as portable computers and cellular telephones are often provided with wireless communications capabilities. To satisfy consumer demand for small form factor wireless devices, manufacturers are continually striving to implement wireless communications circuitry such as antenna components using compact structures. At the same time, there is a desire for antennas to exhibit sufficient levels of radio-frequency performance.

SUMMARY

An electronic device may be provided with an antenna module having a substrate. An antenna may be disposed on the substrate. The substrate may have transmission line layers and antenna layers separated by a ground layer. The antenna may have a directly fed patch and parasitic patches in the antenna layers. The antenna may be fed by a transmission line in the transmission line layers. A feed via may couple a signal trace in the transmission line layers to a feed terminal on the directly fed patch.

The parasitic patches may include a first layer of parasitic patches separated by a gap overlapping the directly fed patch. The parasitic patches may include an additional parasitic patch formed in a second layer. The additional parasitic patch may overlap the gap. A floating ground via may couple a center of the additional parasitic patch and a center of the directly fed patch to a landing pad in the ground layer. The landing pad may short the floating ground via and thus the additional parasitic patch and the directly fed patch to the ground layer at the radiating frequency of the antenna. The landing pad may be electrically floating with respect to the ground layer at DC frequencies.

DETAILED DESCRIPTION

Figure 1:
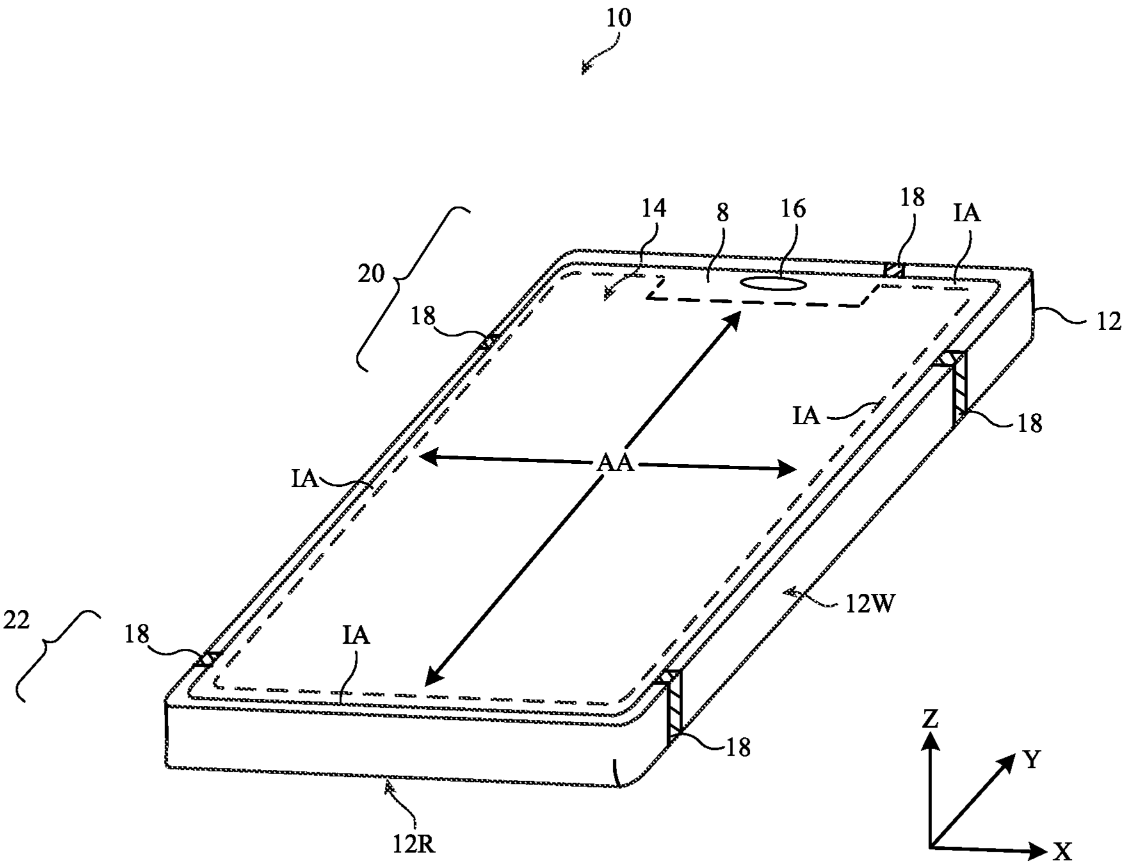
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals. The antennas may include phased antenna arrays that are used for performing wireless communications and/or spatial ranging operations using millimeter and centimeter wave signals. Millimeter wave signals, which are sometimes referred to as extremely high frequency (EHF) signals, propagate at frequencies above about 30 GHz (e.g., at 60 GHz or other frequencies between about 30 GHz and 300 GHz). Centimeter wave signals propagate at frequencies between about 10 GHz and 30 GHz. If desired, device 10 may also contain antennas for handling satellite navigation system signals, cellular telephone signals, local wireless area network signals, near-field communications, light-based wireless communications, or other wireless communications.

Device 10 may be a portable electronic device or other suitable electronic device. For example, device 10 may be a laptop computer, a tablet computer, a somewhat smaller device such as a wrist-watch device, pendant device, headphone device, earpiece device, headset device (e.g., virtual, augmented, or mixed reality glasses or goggles), or another wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions.

Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region or notch that extends into active area AA (e.g., at speaker port 16). Active area AA may, for example, be defined by the lateral area of a display module for display 14 (e.g., a display module that includes pixel circuitry, touch sensor circuitry, etc.).

The display module may have a recess, island, or notch in upper region 20 of device 10 that is free from active display circuitry (i.e., that forms notch 8 of inactive area IA). Notch 8 may be a substantially rectangular region that is surrounded (defined) on three sides by active area AA and on a fourth side by peripheral conductive housing structures 12W. Alternatively, notch 8 may be surrounded on all sides by active area AA (e.g., notch 8 may be detached from housing 12 and may form an island of inactive area IA surrounded by active area AA). One or more sensors may be aligned with notch 8 and may transmit and/or receive light through display 14 within notch 8.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or mid-chassis) that spans the walls of housing 12 between rear housing wall 12R and display 10. The mid-chassis may be welded to opposing walls of peripheral conductive housing structures 12W or, if desired, the mid-chassis and peripheral conductive housing walls 12W may be formed from a single integral piece of machined metal. Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

To provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In some implementations, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. An example in which device 10 includes three or four upper antennas and five lower antennas is described herein as an example. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
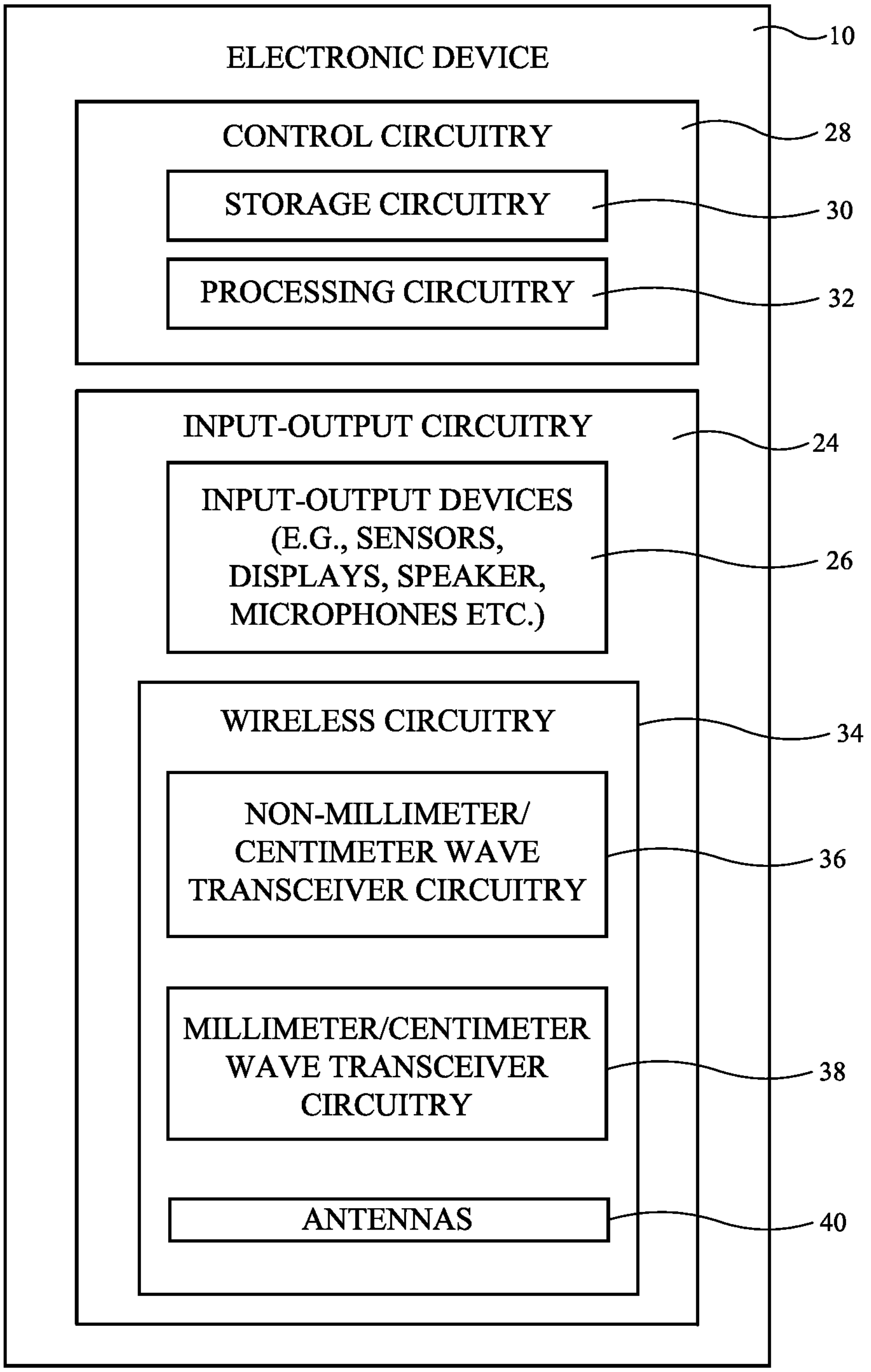
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 28. Control circuitry 28 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 28 may include processing circuitry such as processing circuitry 32. Processing circuitry 32 may be used to control the operation of device 10. Processing circuitry 32 may include one or more processors such as microprocessors, microcontrollers, digital signal processors, host processors, baseband processor integrated circuits, application specific integrated circuits, graphics processing units, central processing units (CPUs), etc. Control circuitry 28 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 28 may be used to run software on device 10 such as internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 24. Input-output circuitry 24 may include input-output devices 26. Input-output devices 26 may be used to allow data to be supplied to device 10 and to allow data to be provided from device 10 to external devices. Input-output devices 26 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 24 may include wireless circuitry such as wireless circuitry 34 for wirelessly conveying radio-frequency signals. While control circuitry 28 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 28 (e.g., portions of control circuitry 28 may be implemented on wireless circuitry 34). As an example, control circuitry 28 may include baseband processor circuitry or other control components that form a part of wireless circuitry 34.

Wireless circuitry 34 may include millimeter and centimeter wave transceiver circuitry such as millimeter/centimeter wave transceiver circuitry 38. Millimeter/centimeter wave transceiver circuitry 38 may support communications at frequencies between about 10 GHz and 300 GHz. For example, millimeter/centimeter wave transceiver circuitry 38 may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, millimeter/centimeter wave transceiver circuitry 38 may support communications in an IEEE K communications band between about 18 GHz and 27 GHz, a $K_a$ communications band between about 26.5 GHz and 40 GHz, a $K_u$ communications band between about 12 GHz and 18 GHz, a V communications band between about 40 GHz and 75 GHz, a W communications band between about 75 GHz and 110 GHz, or any other desired frequency band between approximately 10 GHz and 300 GHz. If desired, millimeter/centimeter wave transceiver circuitry 38 may support IEEE 802.11ad communications at 60 GHz (e.g., WiGig or 60 GHz Wi-Fi bands around 57-61 GHz), and/or $5^{th}$ generation mobile networks or $5^{th}$ generation wireless systems (5G) New Radio (NR) Frequency Range 2 (FR2) communications bands between about 24 GHz and 90 GHz. If desired, millimeter/centimeter wave transceiver circuitry 38 may include sub-THz or THz transceiver circuitry for conveying signals at sub-THz, THF, or THz frequencies between around 100 GHz and 1000 GHz (e.g., under a 6G communications protocol). Millimeter/centimeter wave transceiver circuitry 38 may be formed from one or more integrated circuits (e.g., multiple integrated circuits mounted on a common printed circuit in a system-in-package device, one or more integrated circuits mounted on different substrates, etc.).

If desired, millimeter/centimeter wave transceiver circuitry 38 (sometimes referred to herein simply as transceiver circuitry 38 or millimeter/centimeter wave circuitry 38) may perform spatial ranging operations using radio-frequency signals at millimeter and/or centimeter wave frequencies that are transmitted and received by millimeter/centimeter wave transceiver circuitry 38. The received signals may be a version of the transmitted signals that have been reflected off of external objects and back towards device 10. Control circuitry 28 may process the transmitted and received signals to detect or estimate a range between device 10 and one or more external objects in the surroundings of device 10 (e.g., objects external to device 10 such as the body of a user or other persons, other devices, animals, furniture, walls, or other objects or obstacles in the vicinity of device 10). If desired, control circuitry 28 may also process the transmitted and received signals to identify a two or three-dimensional spatial location of the external objects relative to device 10.

Spatial ranging operations performed by millimeter/centimeter wave transceiver circuitry 38 are unidirectional. If desired, millimeter/centimeter wave transceiver circuitry 38 may also perform bidirectional communications with external wireless equipment such as external wireless equipment 10 (e.g., over a bi-directional millimeter/centimeter wave wireless communications link). The external wireless equipment may include other electronic devices such as electronic device 10, a wireless base station, wireless access point, a wireless accessory, or any other desired equipment that transmits and receives millimeter/centimeter wave signals. Bidirectional communications involve both the transmission of wireless data by millimeter/centimeter wave transceiver circuitry 38 and the reception of wireless data that has been transmitted by external wireless equipment. The wireless data may, for example, include data that has been encoded into corresponding data packets such as wireless data associated with a telephone call, streaming media content, internet browsing, wireless data associated with software applications running on device 10, email messages, etc.

If desired, wireless circuitry 34 may include transceiver circuitry for handling communications at frequencies below 10 GHz such as non-millimeter/centimeter wave transceiver circuitry 36. For example, non-millimeter/centimeter wave transceiver circuitry 36 may handle wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, etc.), near-field communications frequency bands (e.g., at 13.56 MHz), satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, or a BeiDou Navigation Satellite System (BDS) band, ultra-wideband (UWB) frequency bands that operate under the IEEE 802.15.4 protocol and/or other ultra-wideband communications protocols, communications bands under the family of 3GPP wireless communications standards, communications bands under the IEEE 802. XX family of standards, satellite communications bands such as an L-band, S-band (e.g., from 2-4 GHz), C-band (e.g., from 4-8 GHz), X-band, Ku-band (e.g., from 12-18 GHz), Ka-band (e.g., from 26-40 GHz), etc., industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. The communications bands handled by the radio-frequency transceiver circuitry may sometimes be referred to herein as frequency bands or simply as "bands," and may span corresponding ranges of frequencies. Non-millimeter/centimeter wave transceiver circuitry 36 and millimeter/centimeter wave transceiver circuitry 38 may each include one or more integrated circuits, power amplifier circuitry, low-noise input amplifiers, passive radio-frequency components, switching circuitry, transmission line structures, and other circuitry for handling radio-frequency signals.

If desired, non-millimeter/centimeter wave transceiver circuitry 36 and millimeter/centimeter wave transceiver circuitry 38 may be integrated into a single transceiver for handling any desired bands. Radio-frequency transceiver circuitry in wireless circuitry 34 may include respective transceivers (e.g., transceiver integrated circuits or chips) that handle different frequency bands or any desired number of transceivers that handle two or more frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). The radio-frequency transceiver circuitry may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

As shown in FIG. 2, wireless circuitry 34 may include antennas 40. The transceiver circuitry may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

In satellite navigation system links, cellular telephone links, and other long-range links, radio-frequency signals are typically used to convey data over thousands of feet or miles. In Wi-Fi® and Bluetooth® links at 2.4 and 5 GHz and other short-range wireless links, radio-frequency signals are typically used to convey data over tens or hundreds of feet. Millimeter/centimeter wave transceiver circuitry 38 may convey radio-frequency signals over short distances that travel over a line-of-sight path. To enhance signal reception for millimeter and centimeter wave communications, phased antenna arrays and beam forming (steering) techniques may be used (e.g., schemes in which antenna signal phase and/or magnitude for each antenna in an array are adjusted to perform beam steering). Antenna diversity schemes may also be used to ensure that the antennas that have become blocked or that are otherwise degraded due to the operating environment of device 10 can be switched out of use and higher-performing antennas used in their place.

Antennas 40 in wireless circuitry 34 may be formed using any suitable antenna types. For example, antennas 40 may include antennas with resonating elements that are formed from stacked patch antenna structures, loop antenna structures, patch antenna structures, inverted-F antenna structures, slot antenna structures, planar inverted-F antenna structures, monopole antenna structures, dipole antenna structures, helical antenna structures, Yagi (Yagi-Uda) antenna structures, hybrids of these designs, etc. In another suitable arrangement, antennas 40 may include antennas with dielectric resonating elements such as dielectric resonator antennas. If desired, one or more of antennas 40 may be cavity-backed antennas. Different types of antennas may be used for different bands and combinations of bands. For example, one type of antenna may be used in forming a non-millimeter/centimeter wave wireless link for non-millimeter/centimeter wave transceiver circuitry 36 and another type of antenna may be used in conveying radio-frequency signals at millimeter and/or centimeter wave frequencies for millimeter/centimeter wave transceiver circuitry 38. Antennas 40 that are used to convey radio-frequency signals at millimeter and centimeter wave frequencies may be arranged in one or more phased antenna arrays.

Figure 3:
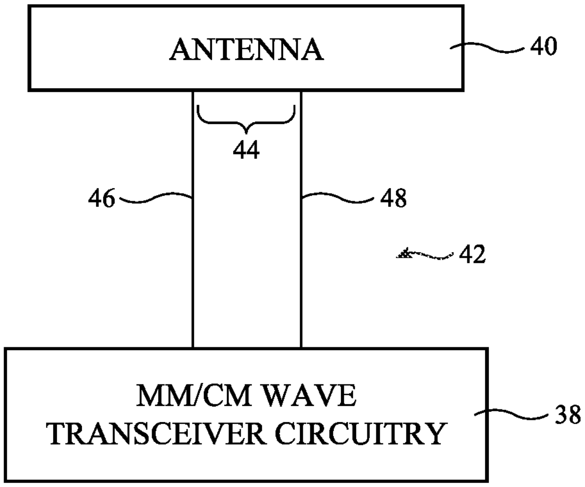
FIG. 3 is a schematic diagram of illustrative wireless circuitry in accordance with some embodiments.

A schematic diagram of an antenna 40 that may be formed in a phased antenna array for conveying radio-frequency signals at millimeter and centimeter wave frequencies is shown in FIG. 3. As shown in FIG. 3, antenna 40 may be coupled to millimeter/centimeter (MM/CM) wave transceiver circuitry 38. Millimeter/centimeter wave transceiver circuitry 38 may be coupled to antenna feed 44 of antenna 40 using a transmission line path that includes radio-frequency transmission line 42. Radio-frequency transmission line 42 may include a positive signal conductor such as signal conductor 46 and may include a ground conductor such as ground conductor 48. Ground conductor 48 may be coupled to the antenna ground for antenna 40 (e.g., over a ground antenna feed terminal of antenna feed 44 located at the antenna ground). Signal conductor 46 may be coupled to the antenna resonating element for antenna 40. For example, signal conductor 46 may be coupled to a positive antenna feed terminal of antenna feed 44 located at the antenna resonating element.

Radio-frequency transmission line 42 may include a stripline transmission line (sometimes referred to herein simply as a stripline), a coaxial cable, a coaxial probe realized by metalized vias, a microstrip transmission line, an edge-coupled microstrip transmission line, an edge-coupled stripline transmission lines, a waveguide structure, combinations of these, etc. Multiple types of transmission lines may be used to form the transmission line path that couples millimeter/centimeter wave transceiver circuitry 38 to antenna feed 44. Filter circuitry, switching circuitry, impedance matching circuitry, phase shifter circuitry, amplifier circuitry, and/or other circuitry may be interposed on radio-frequency transmission line 42, if desired.

Radio-frequency transmission lines in device 10 may be integrated into ceramic substrates, rigid printed circuit boards, and/or flexible printed circuits. In one suitable arrangement, radio-frequency transmission lines in device 10 may be integrated within multilayer laminated structures (e.g., layers of a conductive material such as copper and a dielectric material such as a resin that are laminated together without intervening adhesive) that may be folded or bent in multiple dimensions (e.g., two or three dimensions) and that maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

Figure 4:
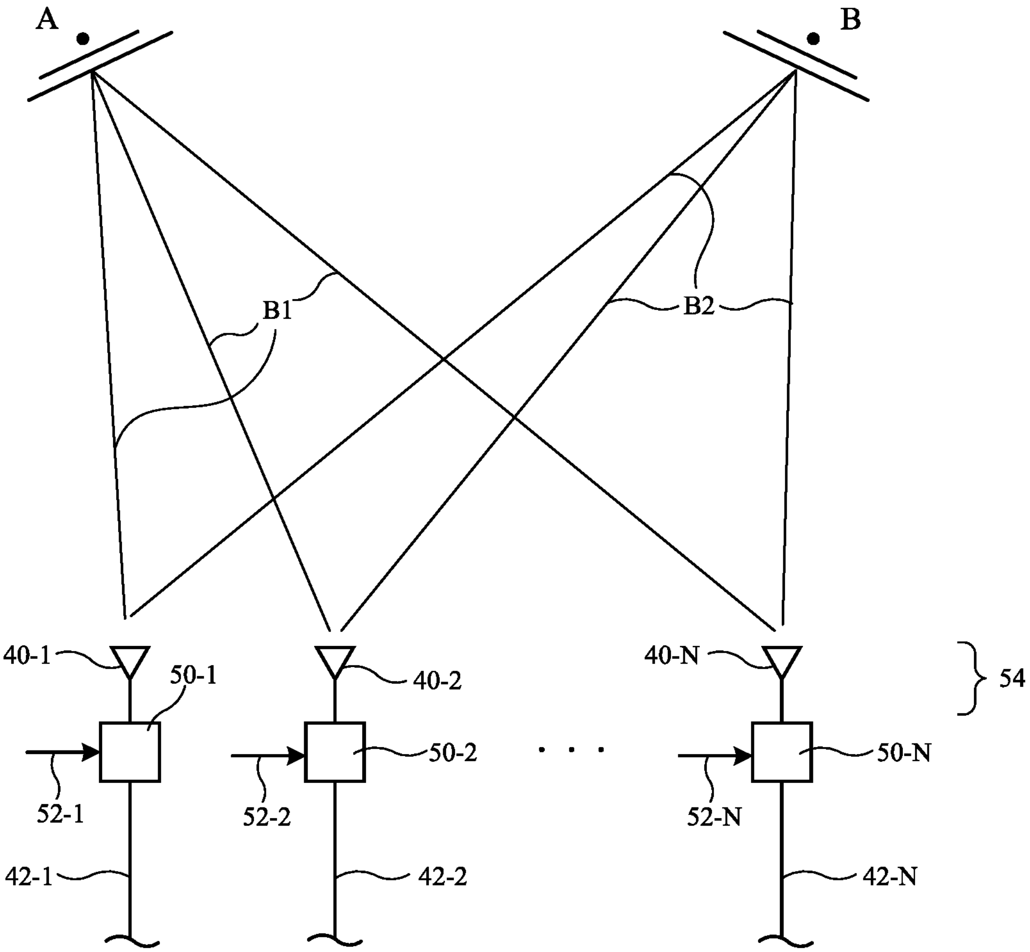
FIG. 4 is a diagram of an illustrative phased antenna array in accordance with some embodiments.

FIG. 4 shows how antennas 40 for handling radio-frequency signals at millimeter and centimeter wave frequencies may be formed in a phased antenna array. As shown in FIG. 4, phased antenna array 54 (sometimes referred to herein as array 54, antenna array 54, or array 54 of antennas 40) may be coupled to radio-frequency transmission lines 42. For example, a first antenna 40-1 in phased antenna array 54 may be coupled to a first radio-frequency transmission line 42-1, a second antenna 40-2 in phased antenna array 54 may be coupled to a second radio-frequency transmission line 42-2, an Nth antenna 40-N in phased antenna array 54 may be coupled to an Nth radio-frequency transmission line 42-N, etc. While antennas 40 are described herein as forming a phased antenna array, the antennas 40 in phased antenna array 54 may sometimes also be referred to as collectively forming a single phased array antenna.

Antennas 40 in phased antenna array 54 may be arranged in any desired number of rows and columns or in any other desired pattern (e.g., the antennas need not be arranged in a grid pattern having rows and columns). During signal transmission operations, radio-frequency transmission lines 42 may be used to supply signals (e.g., radio-frequency signals such as millimeter wave and/or centimeter wave signals) from millimeter/centimeter wave transceiver circuitry 38 (FIG. 3) to phased antenna array 54 for wireless transmission. During signal reception operations, radio-frequency transmission lines 42 may be used to supply signals received at phased antenna array 54 (e.g., from external wireless equipment or transmitted signals that have been reflected off of external objects) to millimeter/centimeter wave transceiver circuitry 38 (FIG. 3).

The use of multiple antennas 40 in phased antenna array 54 allows beam steering arrangements to be implemented by controlling the relative phases and magnitudes (amplitudes) of the radio-frequency signals conveyed by the antennas. In the example of FIG. 4, antennas 40 each have a corresponding radio-frequency phase and magnitude controller 50 (e.g., a first phase and magnitude controller 50-1 interposed on radio-frequency transmission line 42-1 may control phase and magnitude for radio-frequency signals handled by antenna 40-1, a second phase and magnitude controller 50-2 interposed on radio-frequency transmission line 42-2 may control phase and magnitude for radio-frequency signals handled by antenna 40-2, an Nth phase and magnitude controller 50-N interposed on radio-frequency transmission line 42-N may control phase and magnitude for radio-frequency signals handled by antenna 40-N, etc.).

Phase and magnitude controllers 50 may each include circuitry for adjusting the phase of the radio-frequency signals on radio-frequency transmission lines 42 (e.g., phase shifter circuits) and/or circuitry for adjusting the magnitude of the radio-frequency signals on radio-frequency transmission lines 42 (e.g., power amplifier and/or low noise amplifier circuits). Phase and magnitude controllers 50 may sometimes be referred to collectively herein as beam steering circuitry (e.g., beam steering circuitry that steers the beam of radio-frequency signals transmitted and/or received by phased antenna array 54).

Phase and magnitude controllers 50 may adjust the relative phases and/or magnitudes of the transmitted signals that are provided to each of the antennas in phased antenna array 54 and may adjust the relative phases and/or magnitudes of the received signals that are received by phased antenna array 54. Phase and magnitude controllers 50 may, if desired, include phase detection circuitry for detecting the phases of the received signals that are received by phased antenna array 54. The term "beam" or "signal beam" may be used herein to collectively refer to wireless signals that are transmitted and received by phased antenna array 54 in a particular direction. The signal beam may exhibit a peak gain that is oriented in a particular pointing direction at a corresponding pointing angle (e.g., based on constructive and destructive interference from the combination of signals from each antenna in the phased antenna array). The term "transmit beam" may sometimes be used herein to refer to radio-frequency signals that are transmitted in a particular direction whereas the term "receive beam" may sometimes be used herein to refer to radio-frequency signals that are received from a particular direction. The receive beam may correspond to a set of phase and magnitude settings that cause signals received across the phased antenna array to coherently add or combine together at the output of the phased antenna array.

If, for example, phase and magnitude controllers 50 are adjusted to produce a first set of phases and/or magnitudes for transmitted radio-frequency signals, the transmitted signals will form a transmit beam as shown by beam B1 of FIG. 4 that is oriented in the direction of point A. If, however, phase and magnitude controllers 50 are adjusted to produce a second set of phases and/or magnitudes for the transmitted signals, the transmitted signals will form a transmit beam as shown by beam B2 that is oriented in the direction of point B. Similarly, if phase and magnitude controllers 50 are adjusted to produce the first set of phases and/or magnitudes, radio-frequency signals (e.g., radio-frequency signals in a receive beam) may be received from the direction of point A, as shown by beam B1. If phase and magnitude controllers 50 are adjusted to produce the second set of phases and/or magnitudes, radio-frequency signals may be received from the direction of point B, as shown by beam B2.

Each phase and magnitude controller 50 may be controlled to produce a desired phase and/or magnitude based on a corresponding control signal 52 received from control circuitry 28 of FIG. 2 (e.g., the phase and/or magnitude provided by phase and magnitude controller 50-1 may be controlled using control signal 52-1, the phase and/or magnitude provided by phase and magnitude controller 50-2 may be controlled using control signal 52-2, etc.). If desired, the control circuitry may actively adjust control signals 52 in real time to steer the transmit or receive beam in different desired directions over time. Phase and magnitude controllers 50 may provide information identifying the phase of received signals to control circuitry 28 if desired.

When performing wireless communications using radio-frequency signals at millimeter wave, centimeter wave, or higher frequencies, the radio-frequency signals are conveyed over a line of sight path between phased antenna array 54 and external communications equipment. If the external object is located at point A of FIG. 4, phase and magnitude controllers 50 may be adjusted to steer the signal beam towards point A (e.g., to steer the pointing direction of the signal beam towards point A). Phased antenna array 54 may transmit and receive radio-frequency signals in the direction of point A. Similarly, if the external communications equipment is located at point B, phase and magnitude controllers 50 may be adjusted to steer the signal beam towards point B (e.g., to steer the pointing direction of the signal beam towards point B). Phased antenna array 54 may transmit and receive radio-frequency signals in the direction of point B.

In the example of FIG. 4, beam steering is shown as being performed over a single degree of freedom for the sake of simplicity (e.g., towards the left and right on the page of FIG. 4). However, in practice, the beam may be steered over two or more degrees of freedom (e.g., in three dimensions, into and out of the page and to the left and right on the page of FIG. 4). Phased antenna array 54 may have a corresponding field of view over which beam steering can be performed (e.g., in a hemisphere or a segment of a hemisphere over the phased antenna array). If desired, device 10 may include multiple phased antenna arrays that each face a different direction to provide coverage from multiple sides of the device.

Any desired antenna structures may be used for implementing antennas 40. In one suitable arrangement that is sometimes described herein as an example, patch antenna structures may be used for implementing antennas 40. Antennas 40 that are implemented using patch antenna structures may sometimes be referred to herein as patch antennas. An illustrative patch antenna that may be used in phased antenna array 54 of FIG. 4 is shown in FIG. 5.

Figure 5:
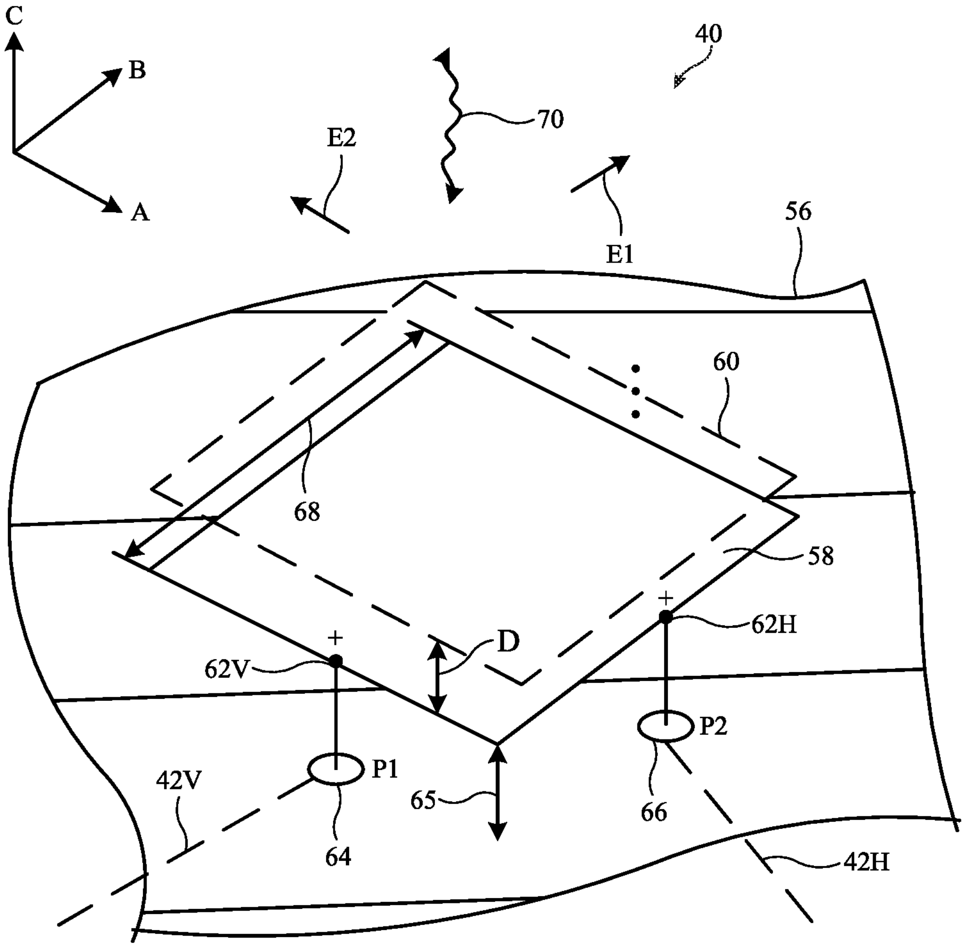
FIG. 5 is a perspective view of illustrative stacked patch antenna structures in accordance with some embodiments.

As shown in FIG. 5, antenna 40 may have a patch antenna resonating element 58 that is separated from and parallel to a ground plane such as antenna ground 56. Patch antenna resonating element 58 may lie within a plane such as the A-B plane of FIG. 5 (e.g., the lateral surface area of element 58 may lie in the A-B plane). Patch antenna resonating element 58 may sometimes be referred to herein as patch 58, patch element 58, patch resonating element 58, antenna resonating element 58, or resonating element 58. Antenna ground 56 may lie within a plane that is parallel to the plane of patch element 58. Patch element 58 and antenna ground 56 may therefore lie in separate parallel planes that are separated by distance 65. Patch element 58 and antenna ground 56 may be formed from conductive traces patterned on a dielectric substrate such as a rigid or flexible printed circuit board substrate or any other desired conductive structures.

The length of the sides of patch element 58 may be selected so that antenna 40 resonates at a desired operating frequency. For example, the sides of patch element 58 may each have a length 68 that is approximately equal to half of the wavelength of the signals conveyed by antenna 40 (e.g., the effective wavelength given the dielectric properties of the materials surrounding patch element 58). In one suitable arrangement, length 68 may be between 0.8 mm and 1.2 mm (e.g., approximately 1.1 mm) for covering a millimeter wave frequency band between 57 GHz and 70 GHz or between 1.6 mm and 2.2 mm (e.g., approximately 1.85 mm) for covering a millimeter wave frequency band between 37 GHz and 41 GHz, as just two examples.

The example of FIG. 5 is merely illustrative. Patch element 58 may have a square shape in which all of the sides of patch element 58 are the same length or may have a different rectangular shape. Patch element 58 may be formed in other shapes having any desired number of straight and/or curved edges.

To enhance the polarizations handled by antenna 40, antenna 40 may be provided with multiple feeds. As shown in FIG. 5, antenna 40 may have a first feed at antenna port P1 that is coupled to a first radio-frequency transmission line 42 such as radio-frequency transmission line 42V. Antenna 40 may have a second feed at antenna port P2 that is coupled to a second radio-frequency transmission line 42 such as radio-frequency transmission line 42H. The first antenna feed may have a first ground feed terminal coupled to antenna ground 56 (not shown in FIG. 5 for the sake of clarity) and a first positive antenna feed terminal 62V coupled to patch element 58. The second antenna feed may have a second ground feed terminal coupled to antenna ground 56 (not shown in FIG. 5 for the sake of clarity) and a second positive antenna feed terminal 62H on patch element 58.

Holes or openings such as openings 64 and 66 may be formed in antenna ground 56. Radio-frequency transmission line 42V may include a vertical conductor (e.g., a conductive through-via, conductive pin, metal pillar, solder bump, feed probe, combinations of these, or other vertical conductive interconnect structures) that extends through opening 64 to positive antenna feed terminal 62V on patch element 58. Radio-frequency transmission line 42H may include a vertical conductor that extends through opening 66 to positive antenna feed terminal 62H on patch element 58. This example is merely illustrative and, if desired, other transmission line structures may be used (e.g., coaxial cable structures, stripline transmission line structures, etc.).

When using the first antenna feed associated with port P1, antenna 40 may transmit and/or receive radio-frequency signals having a first polarization (e.g., the electric field E1 of radio-frequency signals 70 associated with port P1 may be oriented parallel to the B-axis in FIG. 5). When using the antenna feed associated with port P2, antenna 40 may transmit and/or receive radio-frequency signals having a second polarization (e.g., the electric field E2 of radio-frequency signals 70 associated with port P2 may be oriented parallel to the A-axis of FIG. 5 so that the polarizations associated with ports P1 and P2 are orthogonal to each other).

One of ports P1 and P2 may be used at a given time so that antenna 40 operates as a single-polarization antenna or both ports may be operated at the same time so that antenna 40 operates with other polarizations (e.g., as a dual-polarization antenna, a circularly-polarized antenna, an elliptically-polarized antenna, etc.). If desired, the active port may be changed over time so that antenna 40 can switch between covering vertical or horizontal polarizations at a given time. Ports P1 and P2 may be coupled to different phase and magnitude controllers 50 (FIG. 3) or may both be coupled to the same phase and magnitude controller 50. If desired, ports P1 and P2 may both be operated with the same phase and magnitude at a given time (e.g., when antenna 40 acts as a dual-polarization antenna). If desired, the phases and magnitudes of radio-frequency signals conveyed over ports P1 and P2 may be controlled separately and varied over time so that antenna 40 exhibits other polarizations (e.g., circular or elliptical polarizations).

If care is not taken, antennas 40 such as dual-polarization patch antennas of the type shown in FIG. 5 may have insufficient bandwidth for covering relatively wide ranges of frequencies. It may be desirable for antenna 40 to be able to cover a first frequency band, a second frequency band at frequencies higher than the first frequency band, and a third frequency higher than the second frequency band. In one suitable arrangement that is described herein as an example, the first frequency band may include frequencies from about 24.5-29.5 GHz (sometimes referred to herein as a low band), the second frequency band may include frequencies from about 37-43.5 GHz (sometimes referred to herein as a midband), and the third frequency band may include frequencies from about 47-48 GHz (sometimes referred to herein as a high band). In these scenarios, a single patch element 58 may not exhibit sufficient bandwidth on its own to cover an entirety of the first, second, and third frequency bands.

While only a single patch element 58 is shown in FIG. 5 for the sake of clarity, antenna 40 may include multiple patch elements 58 that are vertically stacked and overlapping each other (e.g., along the +C direction). Each patch element 58 may be directly fed using respective antenna feeds and may be coupled to one or two corresponding positive antenna feed terminals 62. Each patch element 58 may have different dimensions or a different size to cover different frequency bands for antenna 40. Additionally or alternatively, antenna 40 may include one or more additional patch elements 60 that are stacked over one or more patch elements 58.

Patch element 60 is unfed (e.g., there are no antenna feed terminals on patch elements 60). As such, patch element 60 is a parasitic patch. Patch element 60 may therefore sometimes be referred to herein as parasitic patch element 60, parasitic patch 60, or parasitic 60. Parasitic patch 60 may partially or completely overlap an underlying patch element 58. If desired, multiple stacked parasitic patches 60 may be provided over an underlying patch element 58 and may be excited by the underlying patch element 58. A lower-most parasitic patch 60 may be separated from a corresponding patch element 58 by distance D, which is selected to provide antenna 40 with a desired bandwidth without occupying excessive volume within device 10. Parasitic patch 60 may be indirectly fed or excited by the underlying directly fed patch element 58. Parasitic patch 60 may have sides with lengths other than length 68, which configure the parasitic patch to radiate at different frequencies than the underlying patch element 58, thereby extending the overall bandwidth of antenna 40.

The combined resonances of each patch element 58 and each parasitic patch 60 in antenna 40 may configure antenna 40 to radiate with satisfactory antenna efficiency across an entirety of the first, second, and third frequency bands (e.g., from 24.5-29.5 GHz, from 37-43.5 GHz, and from 47-48 GHz, or other bands). The example of FIG. 5 is merely illustrative. Parasitic patches 60 may be omitted if desired. Parasitic patches 60 may be rectangular, square, cross-shaped, or any other desired shape having any desired number of straight and/or curved edges. Parasitic patch 60 may be provided at any desired orientation relative to its underlying patch element 58. Antenna 40 may have any desired number of feeds. Other antenna types may be used if desired (e.g., dipole antennas, monopole antennas, slot antennas, etc.).

Figure 6:
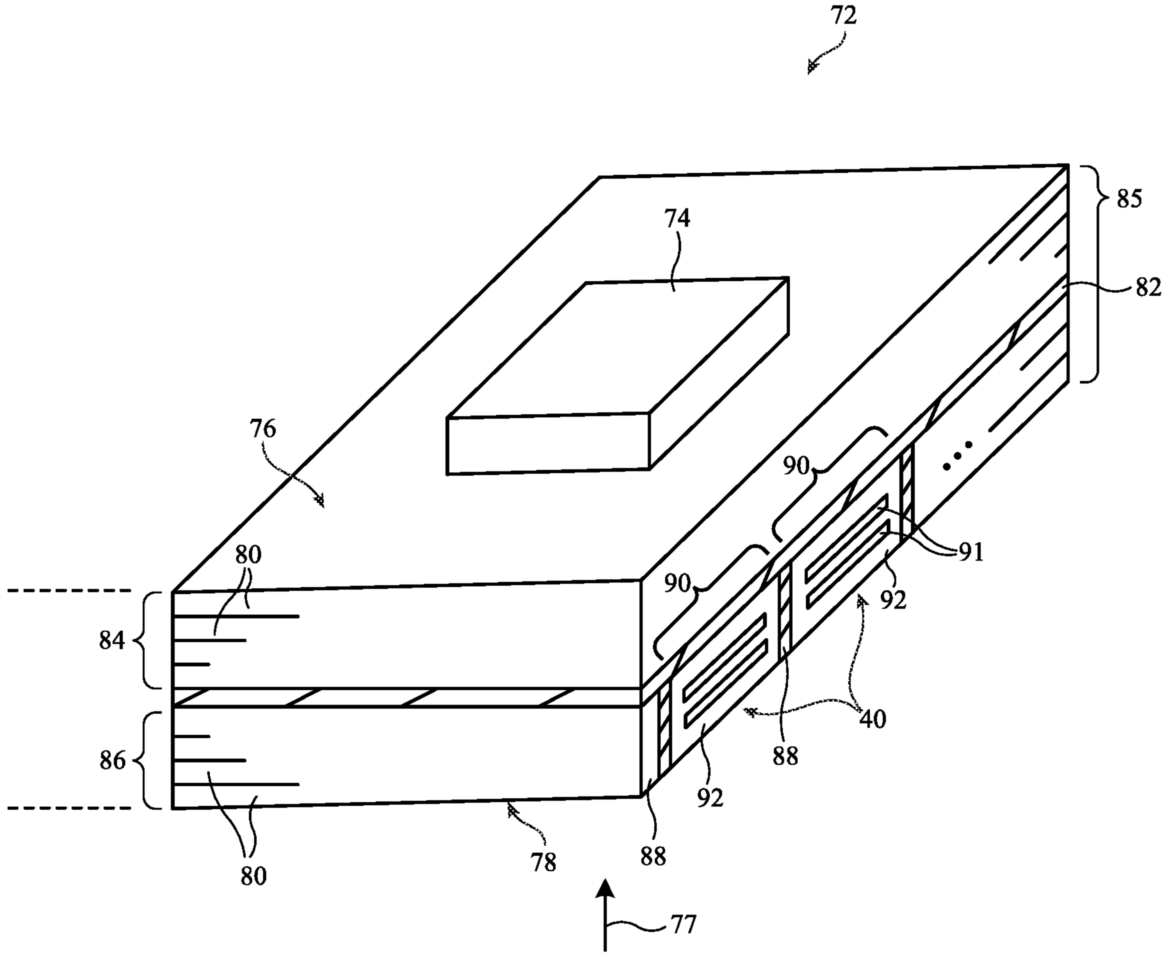
FIG. 6 is a perspective view of an illustrative antenna module having stacked patch antennas in accordance with some embodiments.

If desired, phased antenna array 54 may be integrated with other circuitry such as a radio-frequency integrated circuit to form an integrated antenna module. FIG. 6 is a rear perspective view showing one example of integrated antenna module for handling signals at frequencies greater than 10 GHz in device 10. As shown in FIG. 6, device 10 may be provided with an integrated antenna module such as integrated antenna module 72 (sometimes referred to herein as antenna module 72, antenna panel 72, or module 72).

Antenna module 72 may include phased antenna array 54 of antennas 40 formed on a dielectric substrate such as substrate 85. Substrate 85 may be, for example, a rigid printed circuit board, a flexible printed circuit board, a plastic substrate (e.g., a molded substrate), a polymer substrate, an interposer (e.g., a glass or silicon interposer), a semiconductor substrate (e.g., a silicon integrated circuit chip), or another type of substrate. If desired, substrate 85 may be a stacked dielectric substrate that includes multiple stacked dielectric (insulator) layers 80 (e.g., multiple layers of printed circuit board substrate such as multiple layers of fiberglass-filled epoxy, polymer, silicon or other semiconductors, rigid printed circuit board material, ceramic, polyimide, flexible printed circuit board material, plastic, glass, or other dielectrics). Phased antenna array 54 may include any desired number of antennas 40 arranged in any desired pattern.

Antennas 40 in phased antenna array 54 may include antenna elements such as patch elements 91 (e.g., patch elements 91 may form patch element 58 and/or one or more parasitic patches 60 of FIG. 5). Patch elements 91 may be formed from one or more metallization layers of substrate 85. Ground layer 82 may be formed from one or more metallization layers of substrate 85 (e.g., may include conductive traces forming antenna ground 56 of FIG. 5 for each of the antennas 40 in phased antenna array 54). Patch elements 91 may be patterned on (bottom) surface 78 of substrate 85 or may be embedded within dielectric layers 80 at or adjacent to surface 78. Only two patch elements 91 are shown in FIG. 6 for the sake of clarity. This is merely illustrative and, in general, antennas 40 may include any desired number of patch elements 91.

One or more electrical components 74 may be mounted on (top) surface 76 of substrate 85 (e.g., the surface of substrate 85 opposite surface 78 and patch elements 91). Component 74 may, for example, include an integrated circuit (e.g., an integrated circuit chip) or other circuitry mounted to surface 76 of substrate 85. Component 74 may include radio-frequency components such as amplifier circuitry, phase shifter circuitry (e.g., phase and magnitude controllers 50 of FIG. 4), and/or other circuitry that operates on radio-frequency signals. Component 74 may sometimes be referred to herein as radio-frequency integrated circuit (RFIC) 74. However, this is merely illustrative and, in general, the circuitry of RFIC 74 need not be formed on an integrated circuit. Component 74 may be embedded within a plastic overmold if desired.

The dielectric layers 80 in substrate 85 may include a first set of layers 86 (sometimes referred to herein as antenna layers 86) and a second set of layers 84 (sometimes referred to herein as transmission line layers 84). Ground layer 82 may separate antenna layers 86 from transmission line layers 84. Conductive traces or other metal layers on transmission line layers 84 may be used in forming transmission line structures such as radio-frequency transmission lines 42 of FIG. 4 (e.g., radio-frequency transmission lines 42V and 42H of FIG. 5). For example, conductive traces on transmission line layers 84 may be used in forming stripline or microstrip transmission lines that are coupled between the antenna feeds for antennas 40 (e.g., over conductive vias extending through antenna layers 86) and RFIC 74 (e.g., over conductive vias extending through transmission line layers 84). A board-to-board connector (not shown) may couple RFIC 74 to the baseband and/or transceiver circuitry for phased antenna array 54 (e.g., millimeter/centimeter wave transceiver circuitry 38 of FIG. 3).

If desired, each antenna 40 in phased antenna array 54 may be laterally surrounded by fences of conductive vias 88 (e.g., conductive vias extending parallel to the X-axis and through antenna layers 86 of FIG. 6). The fences of conductive vias 88 for phased antenna array 54 may be shorted to ground traces 82 so that the fences of conductive vias 88 are held at a ground potential. Conductive vias 88 may extend downwards to surface 78 or to the same dielectric layer 80 as the bottom-most conductive patch 91 in phased antenna array 54.

The fences of conductive vias 88 may be opaque at the frequencies covered by antennas 40. Each antenna 40 may lie within a respective antenna cavity 92 having conductive cavity walls defined by a corresponding set of fences of conductive vias 88 in antenna layers 86. The fences of conductive vias 88 may help to ensure that each antenna 40 in phased antenna array 54 is suitably isolated, for example. Phased antenna array 54 may include a number of antenna unit cells 90. Each antenna unit cell 90 may include respective fences of conductive vias 88, a respective antenna cavity 92 defined by (e.g., laterally surrounded by) those fences of conductive vias, and a respective antenna 40 (e.g., set of patch elements 91) within that antenna cavity 92. Conductive vias 88 may be omitted if desired.

The antennas on antenna module 72 may convey radio-frequency signals and may perform beamforming through any desired cover layer of device 10. For example, antennas 40 may convey radio-frequency signals through one or more dielectric antenna windows (apertures) in peripheral conductive housing structures 12W (FIG. 1), through one or more dielectric portions of rear housing wall 12R (FIG. 1), or through a display cover layer of display 14 (e.g., within notch 8 of FIG. 1). In implementations where antenna module 72 radiates through rear housing wall 12R, antenna module 72 may be pressed against a dielectric cover layer in rear housing wall 12R or may be spaced apart from the dielectric cover layer by an air gap (e.g., a 260-600 micron air gap).

Figure 7:
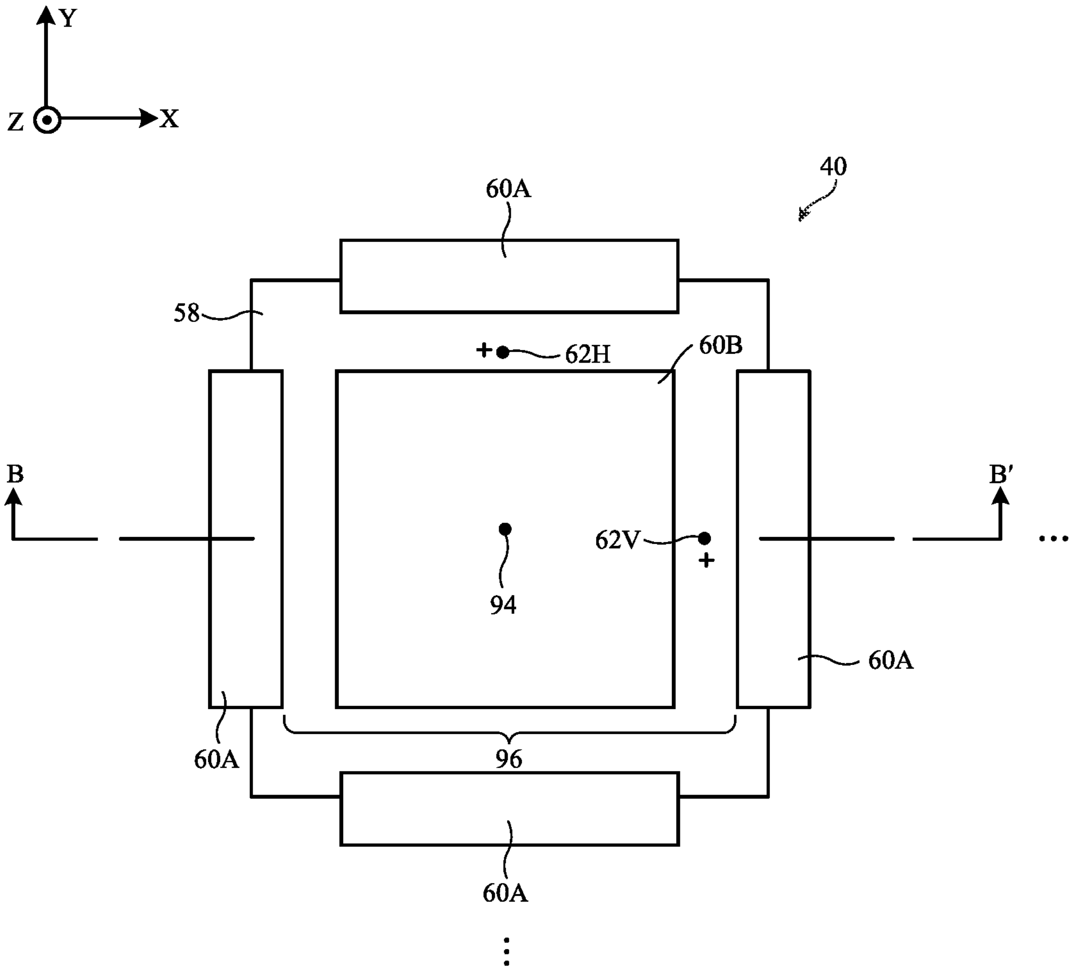
FIG. 7 is a top view of an illustrative stacked patch antenna having a floating ground via in accordance with some embodiments.

The antennas 40 in antenna module 72 may be implemented as stacked patch antennas having multiple layers of parasitic patches 60 and having a floating ground via. FIG. 7 is a front view of an illustrative antenna 40 that is implemented as a stacked patch antenna having multiple layers of parasitic patches 60 and having a floating ground via (e.g., as viewed in the direction of arrow 77 of FIG. 6). Substrate 85 and ground layer 82 of FIG. 6 have been omitted from FIG. 7 for the sake of clarity.

As shown in FIG. 7, antenna 40 may include a directly fed patch element such as patch element 58. Patch element 58 may be coupled to positive antenna feed terminals 62V and 62H (e.g., along orthogonal edges of patch element 58). Antenna 40 may include multiple layers of parasitic patches 60 that at least partially overlap patch element 58. For example, antenna 40 may include parasitic patches 60A that lie in a first plane over the plane of patch element 58. Antenna 40 may also include a parasitic patch 60B that lies in a second plane over the first plane.

Parasitic patches 60A may at least partially overlap patch element 58. For example, each parasitic patch 60A may overlap a respective edge of the underlying patch element 58. Each parasitic patch 60A may be separated from an opposing parasitic patch 60A by gap 96. Gap 96 may overlap patch element 58 and the central axis 94 of patch element 58 (e.g., a vertical axis extending parallel to the Z-axis and through the geometric center of patch element 58). Parasitic patch 60B may overlap gap 96. Central axis 94 may also extend through the geometric center of parasitic patch 60B (e.g., patches 60B and 58 may be centered about central axis 94). In the example of FIG. 7, patch element 60B is non-overlapping with respect to parasitic patches 60A. Alternatively, parasitic patch 60B may at least partially overlap one or more of parasitic patches 60A. The edges of parasitic patch 60B may extend parallel to the edges of parasitic patches 60A and the edges of patch element 58 if desired.

If desired, each parasitic patch 60A may be the same size and shape. Parasitic patches 60A may, for example, be rectangular patches having first and second parallel sides that are shorter than third and fourth parallel sides extending perpendicular to the first and second parallel sides. The length of the third and fourth parallel sides may be selected to be different than the length of the sides of patch element 58 to broaden the bandwidth and frequency response of antenna 40. Parasitic patch 60B and patch element 58 are square patches in this example. The sides of parasitic patch 60B may be shorter than the sides of patch element 58 to broaden the bandwidth and frequency response of antenna 40. The length of the perimeter of patch element 58, the lengths of the perimeters of patch elements 60A, and the length of the perimeter of patch element 60B may be selected to collectively contribute to the overall frequency response and bandwidth of the antenna (e.g., for covering two or more frequency bands).

The example of FIG. 7 is illustrative and non-limiting. Patch element 58 may have other shapes having any desired number of straight and/or curved sides. Parasitic patches 60A may have other shapes having any desired number of straight and/or curved sides. There may be more than four or fewer than four parasitic patches 60A. Parasitic patches 60A may be disposed at other locations relative to the underlying patch element 58. Parasitic patch 60B may have other shapes having any desired number of straight and/or curved sides. There may be more than one parasitic patch 60B if desired. Parasitic patch 60B may be disposed at other locations relative to the underlying parasitic patches 60A and/or patch element 58.

To help mitigate cross-polarization interference between positive antenna feed terminals 62H and 62V, thereby maximizing antenna efficiency in both polarizations covered by antenna 40, patch element 58 and parasitic patch 60B may be shorted to ground layer 82 (FIG. 6) at radio-frequencies at or near central axis 94. Antenna 40 may, for example, include a conductive via that shorts parasitic patch 60B and patch element 58 to ground layer 82 at radio-frequencies. In practice, defects can be introduced to substrate 85 during fabrication. The defects can include shorting of the transmission line(s) for antenna 40 (e.g., to ground). However, these shorting defects can remain undetectable when the conductive via used to short parasitic patch 60B and patch element 58 to ground layer 82 at radio-frequencies is also shorted to ground layer 82 at a direct current (DC) frequency. To mitigate these issues, the conductive via may be a floating ground via that forms a short circuit to ground layer 82 at radio-frequencies but that forms an open circuit at DC.

Figure 8:
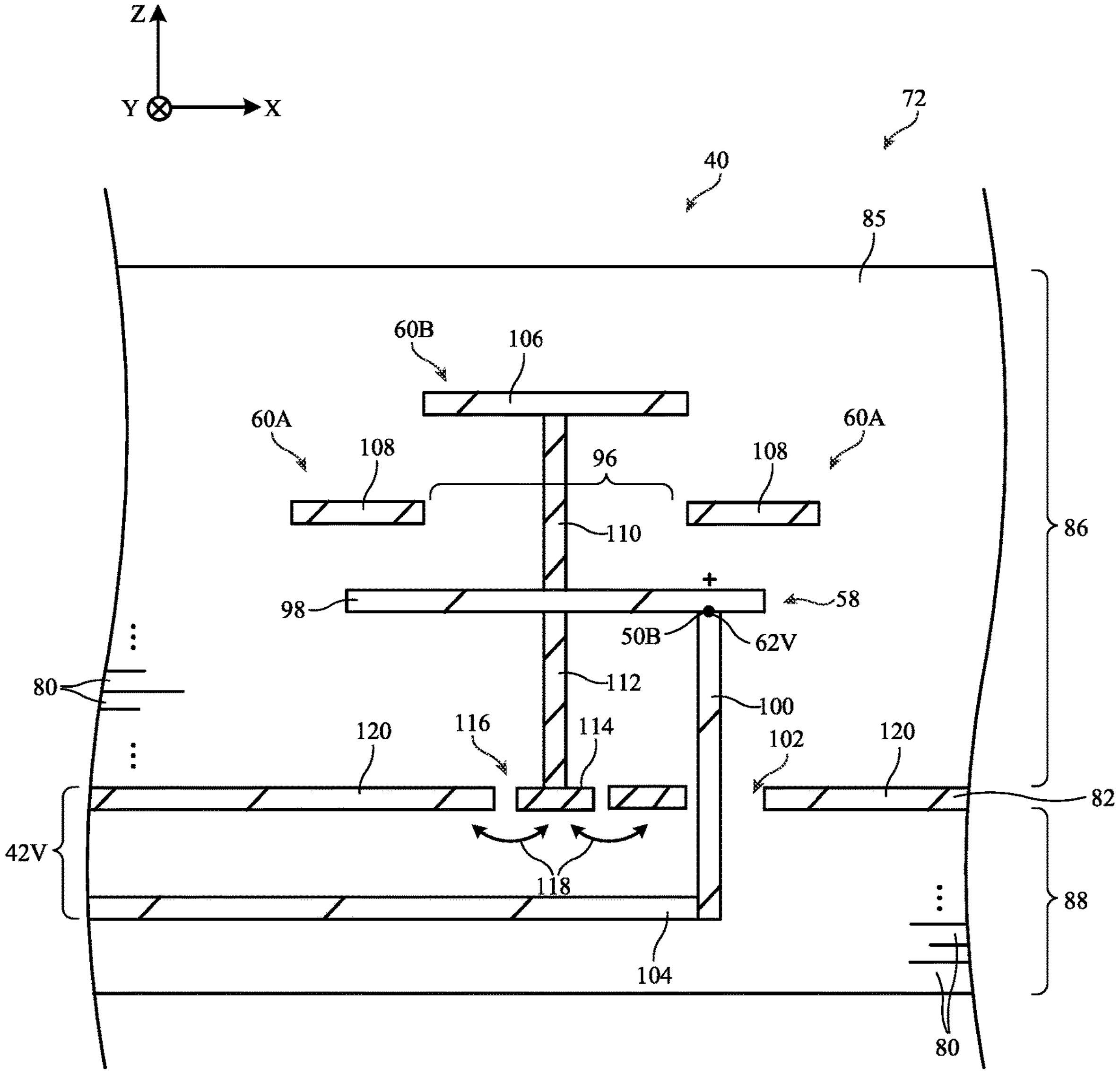
FIG. 8 is a cross-sectional side view of an illustrative stacked patch antenna having a floating ground via in accordance with some embodiments.

FIG. 7 is a cross-sectional side view showing how antenna 40 may be provided with a floating ground via (e.g., as taken in the direction of line BB' of FIG. 7). As shown in FIG. 8, parasitic patch 60B may be formed from a first conductive trace 106 in a first metallization layer of substrate 85 (e.g., on a first dielectric layer 80 in antenna layers 86). Parasitic patches 60A may be formed from second conductive traces 108 in a second metallization layer of substrate 85 (e.g., on a second dielectric layer 80 in antenna layers 86). The first and second metallization layers may be consecutive metallization layers of substrate 85 or, if desired, there may be one or more additional metallization layers (not shown) between the first and second metallization layers.

Patch element 58 may be formed from a third conductive trace 98 in a third metallization layer of substrate 85 (e.g., on a third dielectric layer 80 of antenna layers 86). The second and third metallization layers may be consecutive metallization layers of substrate 85 or, if desired, there may be one or more additional metallization layers (not shown) between the second and third metallization layers. The first metallization layer (e.g., conductive trace 106 and parasitic patch 60B) may be located at a first vertical distance or height from the third metallization layer (e.g., conductive trace 98 and patch element 58). The second metallization layer (e.g., conductive traces 108 and parasitic patches 60A) may be located at a second vertical distance or height from the third metallization layer that is less than the first vertical distance or height (e.g., parasitic patches 60A may be vertically interposed between patch element 58 and parasitic patch 60B).

Ground layer 82 may be formed from fourth conductive traces 120 in a fourth metallization layer of substrate 85 (e.g., separating antenna layers 86 from transmission line layers 88). The third and fourth metallization layers may be consecutive metallization layers of substrate 85 or, if desired, there may be one or more additional metallization layers (not shown) between the third and fourth metallization layers. The third metallization layer and patch element 58 may be vertically interposed between the fourth metallization layer (ground layer 82) and the second metallization layer (parasitic patches 60A).

The radio-frequency transmission line 42V for antenna 40 may be formed from ground traces 120 and a signal trace 104 in transmission line layers 88. Signal trace 104 may be formed from a fifth metallization layer of substrate 85. The fourth and fifth metallization layers may be consecutive metallization layers of substrate 85 or, if desired, there may be one or more additional metallization layers (not shown) between the fourth and fifth metallization layers. The orthogonal positive antenna feed terminal 62H of antenna 40 (FIG. 7) may be similarly fed by an additional radio-frequency transmission line (e.g., radio-frequency transmission line 42H of FIG. 5).

Parasitic patches 60A may be laterally separated by gap 96 overlapping patch element 58. Parasitic patch 60B may overlap gap 96 and patch element 58. Patch element 58 may be directly fed whereas parasitic patches 60A and 60B are not directly fed. First capacitances may be established between parasitic patch 60B and each of the parasitic patches 60A. Second capacitances may be established between each of the parasitic patches 60A and patch element 58. These capacitances may serve to increase the total capacitance between patch element 58 and the upper-most parasitic patch relative to arrangements where antenna 40 includes single-layer parasitic structures, which may allow antenna 40 to exhibit an even more compact volume relative to arrangements where antenna 40 includes single-layer parasitic structures, for example.

The ground traces 120 in ground layer 82 may include an opening such as hole 102 (e.g., opening 64 of FIG. 5) for feeding positive antenna feed terminal 62V. Antenna 40 may include a conductive via 100 that is coupled to signal trace 104. Conductive via 100 may extend through transmission line layers 88, hole 102 in ground layer 82, and antenna layers 86 to positive antenna feed terminal 62V. Conductive via 100 may sometimes also be referred to herein as feed via 100 or feed probe 100.

The ground traces 120 in ground layer 82 (e.g., the fourth metallization layer) may include an additional opening such as hole 116. Hole 116 may separate ground traces 120 in ground layer 82 from a via landing pad such as landing pad 114. Landing pad 114 may be formed from a conductive trace in the fourth metallization layer (e.g., ground layer 82). Landing pad 114 may be laterally surrounded by hole 116 (e.g., in the X-Y plane). In other words, landing pad 114 may be disposed within hole 116 and may be separated from the ground traces 120 of ground layer 82 on all sides by hole 116 (e.g., landing pad 114 is not galvanically connected to ground traces 120).

The dimensions (e.g., width or diameter) of hole 116 may be selected to form a capacitance between landing pad 114 and the surrounding ground traces 120 that configures landing pad 114 to be electrically floating (e.g., forming an open circuit impedance between landing pad 114 and the surrounding ground traces 120) at relatively low frequencies such as a DC frequency or another frequency less than a threshold frequency (e.g., 100 Hz, 50 Hz, 10 Hz, 1 Hz, etc.). At the same time, the dimensions of hole 116 and the capacitance between landing pad 114 and the surrounding ground traces 120 configure landing pad 114 to be electrically shorted to the surrounding ground traces 120 in ground layer 82 (e.g., forming a short circuit impedance or another non-open circuit capacitive impedance between landing pad 114 and ground traces 120) at relatively high frequencies such as the radio frequencies handled by antenna 40 (e.g., frequencies greater than 10 GHz).

As shown in FIG. 8, antenna 40 may include a conductive via 110 coupled (shorted) to conductive trace 106 at central axis 94 (e.g., conductive via 110 may be coupled to the center of parasitic patch 60B and parasitic patch 60B may form a landing pad in the first metallization layer for conductive via 110). Conductive via 110 may extend, along central axis 94, through antenna layers 86 to patch element 58. Conductive via 110 extends through the gap 96 between opposing parasitic patches 60A. Conductive via 110 may be coupled (shorted) to the upper side of conductive trace 98 at central axis 94 (e.g., conductive via 110 may be coupled to the center of patch element 58 and patch element 58 may form a landing pad in the third metallization layer for conductive via 110).

Antenna 40 may also include a conductive via 112 coupled (shorted) to the bottom side of conductive trace 98 at central axis 94 (e.g., conductive via 112 may be coupled to the center of patch element 58 and patch element 58 may form a landing pad in the third metallization layer for conductive via 112). Conductive via 112 may be aligned with conductive via 110 (e.g., conductive vias 110 and 112 may be colinear). Conductive via 110 may extend, along central axis 94, through antenna layers 86 to landing pad 114 in ground layer 82. Conductive via 112 may be coupled (shorted) to landing pad 114. In this way, both parasitic patch 60B and patch element 58 are shorted to ground layer 82 (landing pad 114) by conductive vias 110 and 112.

Since landing pad 114 is electrically floating at DC and electrically shorted to ground traces 120 at radio frequencies, conductive via 112 and thus patch element 58, conductive via 110, and parasitic patch 60B are also shorted to ground traces 120 at radio frequencies, as shown by near-field radio-frequency coupling 118, but not at DC. In other words, since conductive vias 110 and 112 are both coupled to landing pad 114, conductive vias 110 and 112 are electrically floating conductive vias at DC and are electrically grounded conductive vias at radio-frequencies.

Conductive vias 110 and 112 may therefore sometimes also be referred to herein as floating ground vias 110 and 112. While referred to herein as conductive vias 110 and 112, conductive vias 110 and 112 may also be referred to herein as different portions or segments of the same conductive via, which is sometimes referred to herein as a floating ground via (e.g., a floating ground via that extends along central axis 94 and that couples patch element 58 and parasitic patch 60B to landing pad 114). The floating ground via electrically couples (shorts) patch element 58 and parasitic element 60B to ground traces 82 and thus the antenna ground for antenna 40 at radio frequencies but remain electrically floating within ground layer 82 at DC. This may allow conductive vias 110 and 112 to optimize the radio-frequency performance of antenna 40 (e.g., minimizing cross-polarization interference) while also allowing for electrical detection of manufacturing defects in antenna module 72 such as shorts along the radio-frequency transmission line(s) for antenna 40.

The example of FIG. 8 is illustrative and non-limiting. If desired, antenna 40 may have multiple layers of directly fed patch elements 58, a single layer of parasitic patches 60, or more than two layers of parasitic patches 60. The antenna may be implemented using other antenna architectures and may cover any desired frequencies.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:

a substrate having a first, second, and third metallization layers, the second metallization layer being interposed between the first and third metallization layers;

ground traces in the first metallization layer;

an antenna having a directly fed patch in the second metallization layer and a parasitic patch in the third metallization layer, wherein the directly fed patch overlaps the ground traces, the parasitic patch overlaps the directly fed patch, and the antenna is configured to radiate at a frequency;

a hole in the ground traces;

a landing pad in the first metallization layer and disposed in the hole; and a conductive via that couples the parasitic patch and the directly fed patch to the landing pad, wherein the landing pad and the conductive via are configured to electrically short the directly fed patch and the parasitic patch to the ground traces at the frequency.

2. The electronic device of claim 1, wherein the landing pad is electrically floating with respect to the ground traces at an additional frequency lower than the frequency.

3. The electronic device of claim 2, wherein the frequency is greater than 10 GHz and the additional frequency is a direct current (DC) frequency.

4. The electronic device of claim 1, wherein the conductive via extends along a central axis of the parasitic patch and the directly fed patch.

5. The electronic device of claim 4, wherein the conductive via is coupled to a center of the directly fed patch and is coupled to a center of the parasitic patch.

6. The electronic device of claim 5, further comprising:
a feed via coupled to the directly fed patch along an edge of the directly fed patch.

7. The electronic device of claim 6, further comprising:
a fourth metallization layer on the substrate, the first metallization layer being interposed between the fourth and second metallization layers; and
a transmission line having a signal trace formed from the fourth metallization layer, wherein the feed via couples the signal trace to the directly fed patch through an opening in the ground traces.

8. The electronic device of claim 7, further comprising:
an additional transmission line having an additional signal trace formed from the fourth metallization layer; and
an additional feed via that couples the additional signal trace to the directly fed patch along an additional edge of the directly fed patch that is orthogonal to the edge of the directly fed patch.

9. The electronic device of claim 1, further comprising:
a fourth metallization layer on the substrate, the fourth metallization layer being interposed between the second and third metallization layers, wherein the antenna has a set of additional parasitic patches that are formed from the fourth metallization layer and that at least partially overlap the directly fed patch.

10. The electronic device of claim 9, the set of additional parasitic patches comprising a first additional parasitic patch and a second additional parasitic patch separated from the first additional parasitic patch by a gap, wherein the parasitic patch overlaps the gap and the conductive via extends from the directly fed patch to the parasitic patch through the gap.

11. The electronic device of claim 10, wherein the conductive via is coupled to a center of the parasitic patch and a center of the directly fed patch.

12. An antenna module comprising:
a substrate having antenna layers and transmission line layers;
ground traces that separate the antenna layers from the transmission line layers;
a signal trace in the transmission line layers;
an antenna having a first patch overlapping the ground traces and a second patch overlapping the first patch;
a first conductive via that couples the signal trace to the first patch through the transmission line layers, a first hole in the ground traces, and the antenna layers;
a landing pad disposed in a second hole in the ground traces, wherein the landing pad is electrically floating at a direct current (DC) frequency; and
a second conductive via that couples the first patch and the second patch to the landing pad.

13. The antenna module of claim 12, wherein the landing pad is configured to electrically short the second conductive via to the ground traces at a radiating frequency of the antenna.

14. The antenna module of claim 13, wherein the radiating frequency is greater than 10 GHz.

15. The antenna module of claim 12, wherein the second conductive via is coupled to a center of the first patch.

16. The antenna module of claim 15, wherein the second conductive via is coupled to a center of the second patch.

17. The antenna module of claim 12, further comprising:
first, second, third, and fourth parasitic patches at least partially overlapping the first patch and being separated from the first patch by a first distance, wherein the second patch comprises a fifth parasitic patch separated from the first patch by a second distance greater than the first distance.

18. The antenna module of claim 17, wherein the first parasitic patch is laterally separated from the second parasitic patch by a gap, the third parasitic patch is laterally separated from the fourth parasitic patch by the gap, the fifth parasitic patch overlaps the gap, and the second conductive via extends through the gap.

19. An antenna comprising:
a ground layer;
a patch overlapping the ground layer;
an antenna feed terminal coupled to the patch;
first and second parasitic patches overlapping the patch, the first and second parasitic patches being separated by a gap;
a third parasitic patch overlapping the gap; and
a floating ground via that is coupled to the patch and the third parasitic patch and that extends through the gap.

20. The antenna of claim 19, wherein the floating ground via is coupled to a landing pad disposed in a hole in the ground layer, wherein the landing pad exhibits a short circuit impedance to the ground layer at a radiating frequency of the antenna and exhibits an open circuit impedance to the ground layer at a direct current (DC) frequency.

* * * * *